(12) United States Patent
Shimanski

(10) Patent No.: US 7,739,775 B2
(45) Date of Patent: Jun. 22, 2010

(54) RESTRAINT APPARATUS AND METHODS

(76) Inventor: Randall Shimanski, 10125 - 48th Ave. North, Plymouth, MN (US) 55442

( * ) Notice: Subject to any disclaimer, the term of this patent is extended or adjusted under 35 U.S.C. 154(b) by 245 days.

(21) Appl. No.: 11/656,810

(22) Filed: Jan. 22, 2007

(65) Prior Publication Data
US 2008/0172843 A1  Jul. 24, 2008

(51) Int. Cl.
A44B 13/00 (2006.01)
(52) U.S. Cl. .................. 24/265 H; 24/369; 24/370; 248/692; 410/23; 410/101; 410/116
(58) Field of Classification Search ............... 24/265 H, 24/369, 370, 373, 265 CD; 248/690, 692, 248/211; 410/116, 23, 101
See application file for complete search history.

(56) References Cited

U.S. PATENT DOCUMENTS

| | | | |
|---|---|---|---|
| 301,560 A * | 7/1884 | Brooks | 24/370 |
| 600,548 A * | 3/1898 | Moehn | 24/698.3 |
| 684,255 A * | 10/1901 | Hughes | 24/370 |
| 1,426,176 A * | 8/1922 | Gardner | 24/698.1 |
| 1,427,736 A * | 8/1922 | Hendricks | 24/698.1 |
| 4,170,962 A * | 10/1979 | Limbaugh | 24/698.3 |
| 5,209,173 A | 5/1993 | Shell | |
| 5,816,757 A | 10/1998 | Huston | |
| 5,908,274 A | 6/1999 | Silberman | |
| 6,338,185 B1 * | 1/2002 | Solterbeck | 24/131 C |
| 6,606,765 B2 | 8/2003 | Edmondson | |
| 7,144,030 B2 | 12/2006 | Buell et al. | |

* cited by examiner

*Primary Examiner*—Robert J Sandy
(74) *Attorney, Agent, or Firm*—Clise, Billion & Cyr, P.A.; Tim Clise

(57) ABSTRACT

Restraint apparatus and methods for securing items are disclosed. The restraint apparatus include a retention element including an elongated arm secured to a body. The elongated arm defines a spiral to secure a fitting. The spiral of the elongated arm at least in part may define a gap to receive a fitting. A tether may be secured to the body of the retention element to extend across an item to be secured.

20 Claims, 4 Drawing Sheets

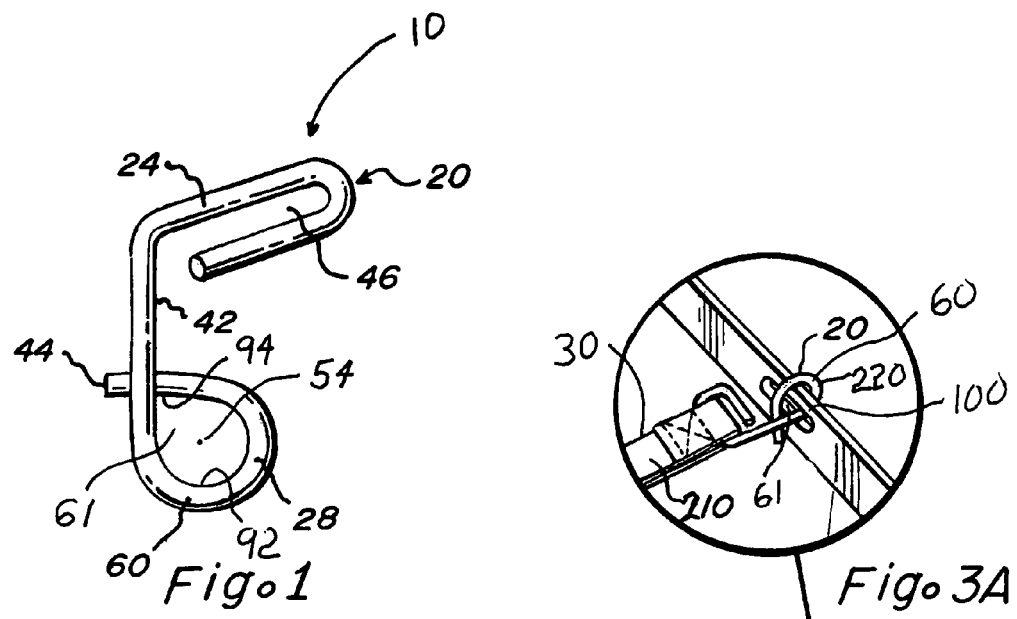
Fig. 1
Fig. 3A
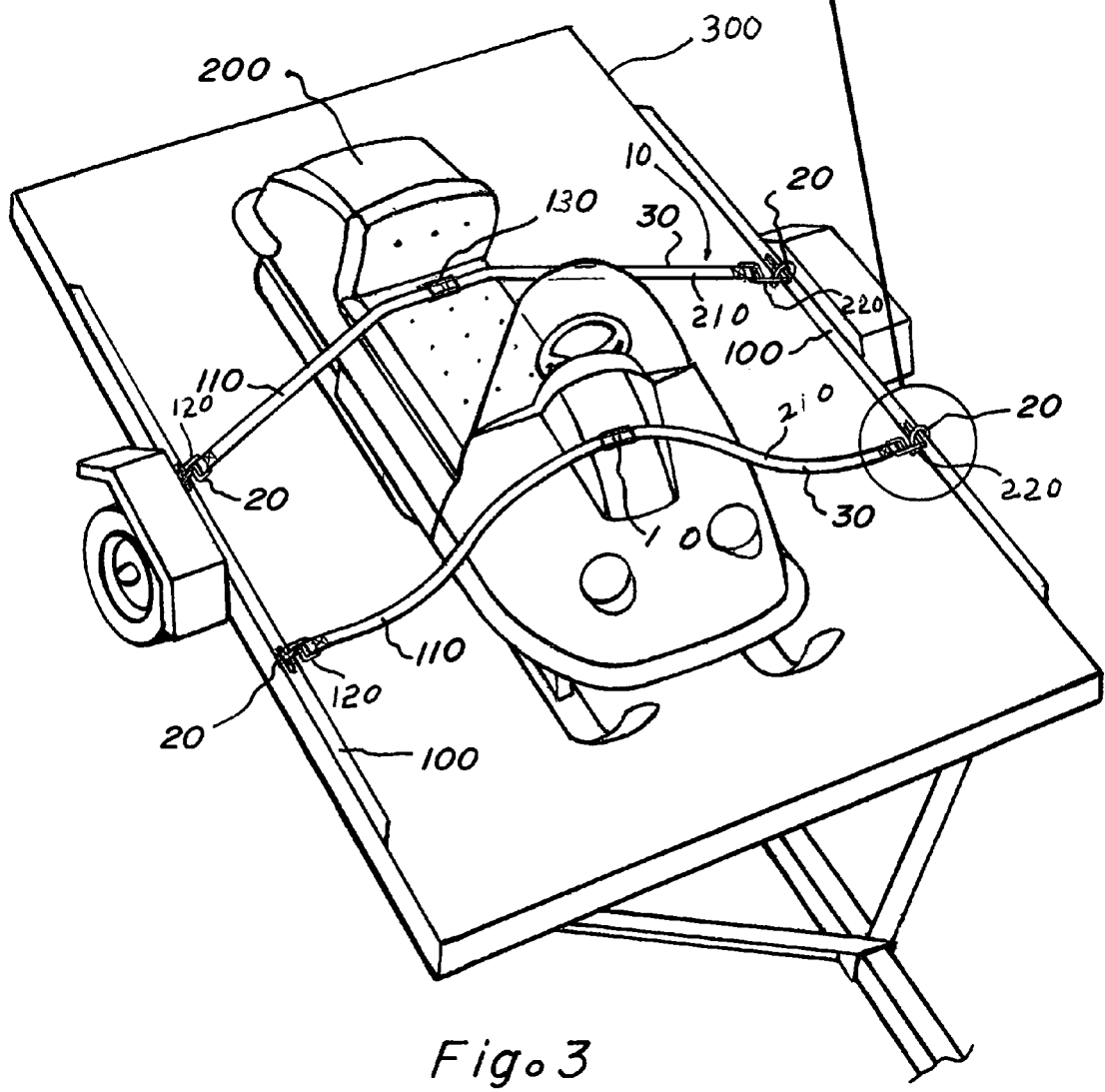
Fig. 3

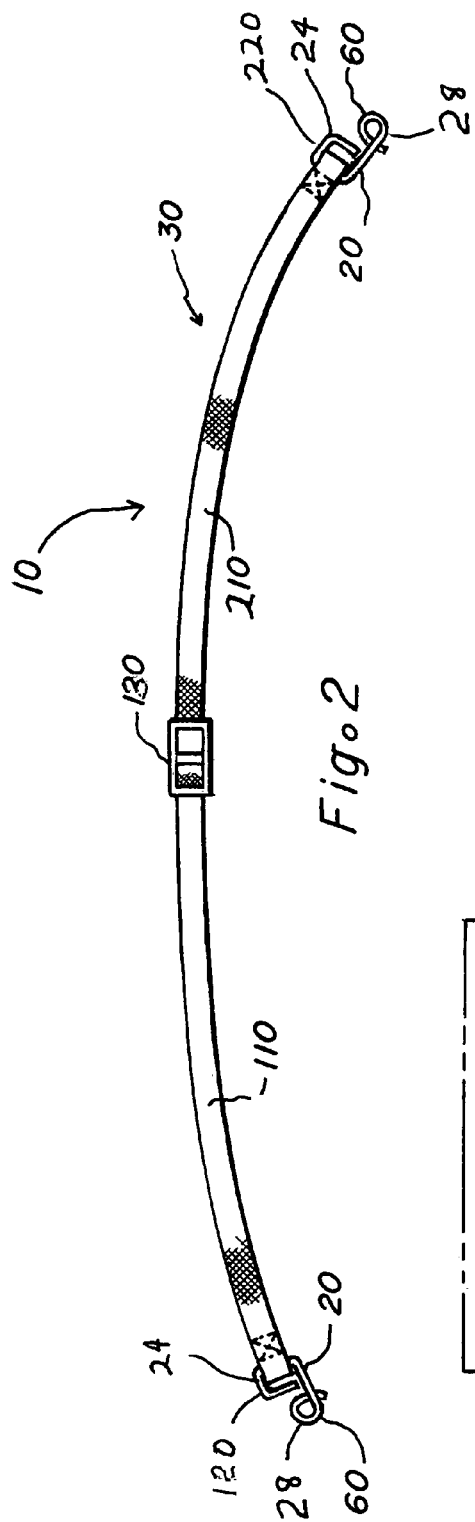
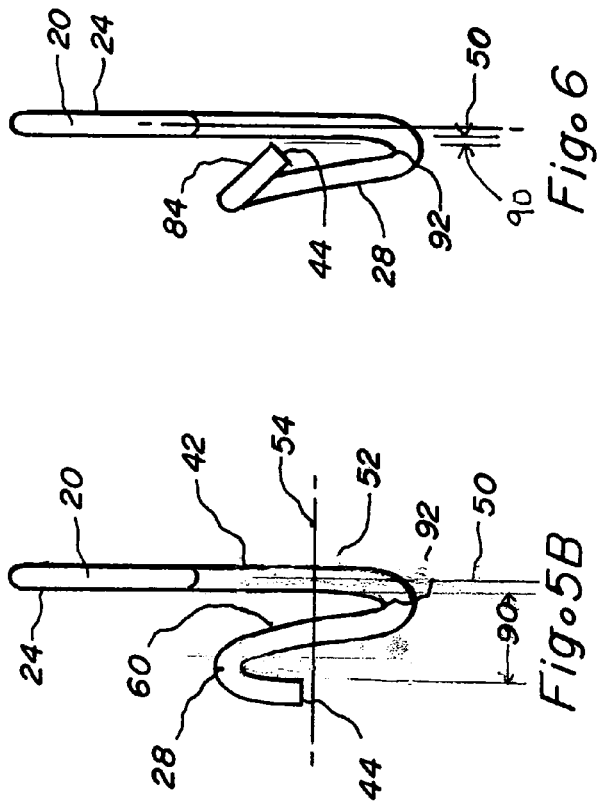
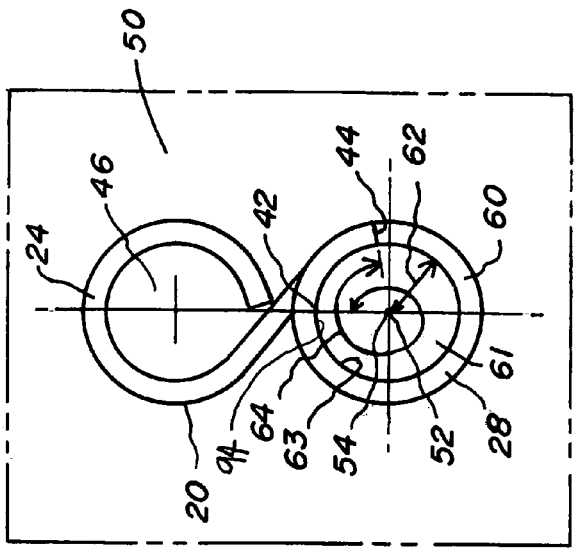

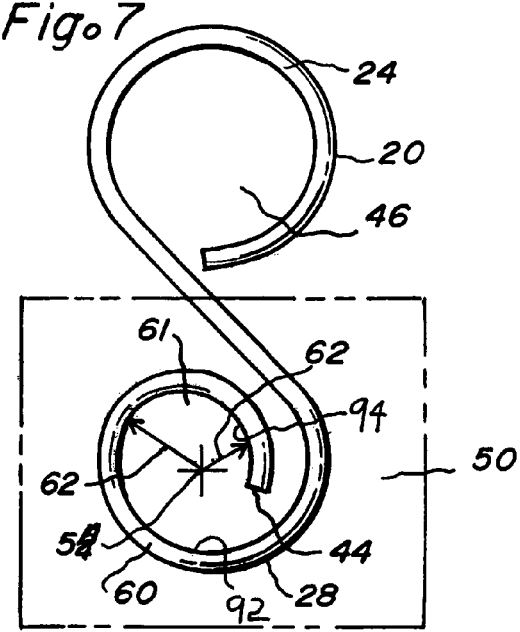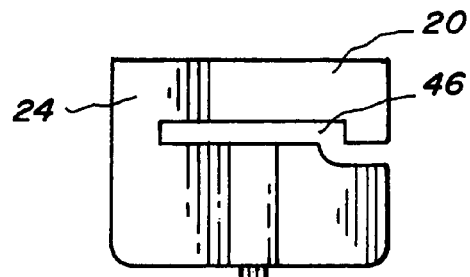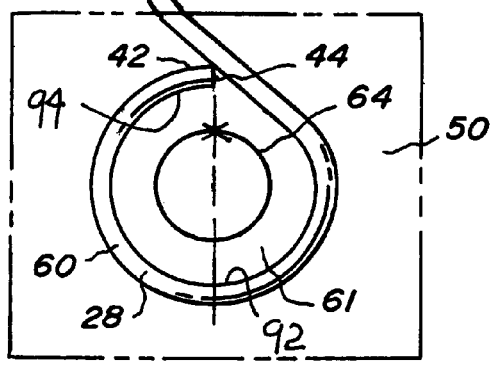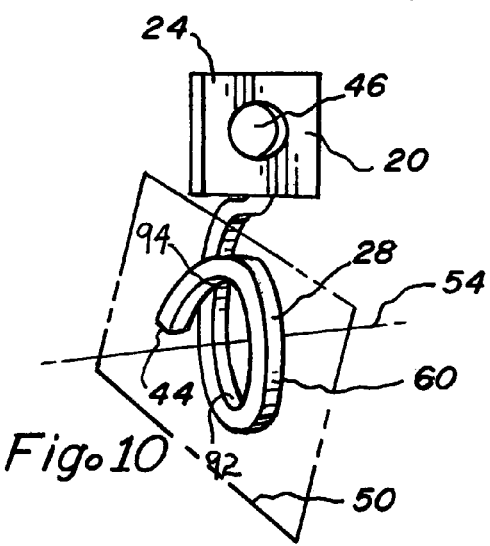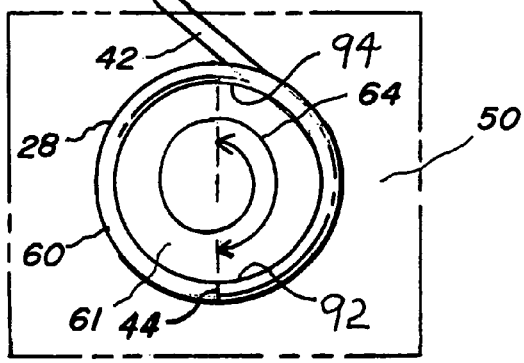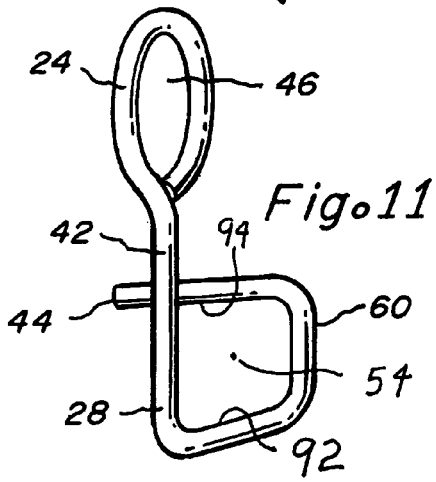

RESTRAINT APPARATUS AND METHODS

BACKGROUND OF THE INVENTION

1. Field of the Invention

The present inventions relate to restraint apparatus and methods, and, more particularly, apparatus and methods for securing items to vehicles or trailers.

2. Description of the Related Art

Various restraints have been developed to secure cargo for transport. These restraints typically include hooks attached to one or more ends of a line. The hook may then secured through a fitting on the trailer, pallet, truck bed or elsewhere. The line is passed over or through the cargo or otherwise cooperates with the cargo to secure the cargo at a desired location. The second end of the line is secured to a second fitting, typically positioned on an opposite side of the cargo from the first fitting. The line is then drawn taut to hold the cargo in place between the two fittings. Depending on the nature of the cargo, a plurality of such restraint devices may be positioned about the cargo to secure the cargo at a desired location.

A hook is commonly configured in a "J" shape or in a "U" shape with the line secured to the top of the long arm of the "J" or to the top of one of the arms of the "U." These shapes are open so that a fitting that is received by such a hook is only partly surrounded by the hook. When a tension is applied to the line, the lower aspect of the "J" or "U" shaped hook is then drawn against the fitting so that the hook and the attached line are secured to the fitting. However, before the line is drawn taut, there is a tendency for the hook to slip out of the fitting through the open end, for example, through open portion of the hook between the short end and the long end of the "J" or the open end of the "U".

This tendency for the hook to slip out of the fitting when the line has slack can make it difficult for a person acting alone to secure the cargo. For example, while the person is passing the line over the cargo or securing the line to a second fitting opposite the first fitting, the hook falls out of the first fitting. The person then must go back and replace the hook through the first fitting and otherwise attempt to keep the line secured to the fittings before the line is drawn tight. Only when the line is actually drawn tight are the traditional hooks secured to the fittings. The wasted effort can be frustrating and time consuming for the users. Further, these tendencies of traditional hooks in the workplace can decrease the productivity in the workplace. Accordingly, a need exists for a hook with a reduced tendency to slip out of the fitting when the line has slack.

In addition, the traditional hooks can potentially unhook from a fitting as the cargo is subjected to various forces during transport. This tendency is exacerbated when the cargo that is compressed or has components which are compressed when secured with a tie-down. For example, motorcycles and ATVs have shocks that typically compress when they are secured to a trailer with a tie-down. The shocks may further compresses when the trailer is pulled over bumps. This compression may loosen the tension on the line and the hooks of the tie-down which can result one or more of the hooks slipping off of the fitting to which they are secured. If one or more of the hooks come off, there is a significant chance the motorcycles and ATVs will come off the trailer. Accordingly, additional needs exist for hooks with a reduced tendency to slip out of the fitting when the line goes slack.

Various carabineers and other spring loaded devices are also available. These mechanisms can freeze up, jam, or otherwise fail. These devices can be awkward to use particularly in cold weather when the user may be wearing mittens or gloves. Also, these devices may require are relatively complex to manufacture with corresponding expense. These costs must then be passed on to the consumer. Accordingly, a need exists for a hook with a reduced tendency to slip out of the fitting that may be manufactured cheaply and efficiently.

SUMMARY OF THE INVENTION

Apparatus and methods in accordance with the present inventions may satisfy one or more of the needs and shortcomings discussed above and may provide additional improvements and advantages as will be recognized by those skilled in the art upon review of the present disclosure.

The present inventions may provide attachment apparatus that include one or more retention elements. In certain aspects, the retention elements are secured to a tether. Each retention element may include a body having an elongated arm extending therefrom. The body may be configured to be secured to a tether. In one aspect, the body may define an aperture to receive a portion of the tether and to retain the retention element on the tether. The elongated arm includes a first end and a second end and an interior surface. The first end of the elongated arm may be secured to the body. In one aspect, the elongated arm can be integral with the body. At least a portion of the elongated arm defines a spiral. Typically, the spiral terminates at the second end of the elongated body. The interior surface defines the interior of the spiral. The elongated arm is generally configured to receive and retain a fitting within the interior of the spiral.

Methods of securing using an attachment apparatus are also provided. The methods may include providing an attachment apparatus with a retention element. The retention element includes a body and an elongated arm. The elongated arm secured to the body. The elongate arm may have a first end and a second end. A portion of the elongated arm toward the second end may include a spiral. A fitting may be provided to secure the retention element. The spiral of the elongated arm may be oriented the with respect to the fitting. The spiral may be oriented to permit the width of the fitting to be received through a gap defined by the elongated arm. The fitting may by passed through the gap of the spiral and positioned within an interior of the spiral. The retention element may be rotated relative to the fitting so that portions of the fitting are generally aligned with an axis extending through the interior. The fitting may be surrounded by the interior surface of the spiral when secured within the retention element.

Other features and advantages of the present inventions will become apparent from the following detailed description, and from the claims.

BRIEF DESCRIPTION OF THE DRAWINGS

FIG. 1 illustrates a perspective view of an exemplary embodiment of a retention element in accordance with aspects of the present inventions;

FIG. 2 illustrates a frontal view of an exemplary embodiment of a retention apparatus in accordance with aspects of the present inventions;

FIG. 3 illustrates a perspective view of an exemplary embodiment of a retention apparatus in accordance with aspects of the present inventions securing a snowmobile to a trailer;

FIG. 3A illustrates a detailed perspective view of the cooperation of the tether and the retention element of the retention apparatus and the fitting of the trailer as illustrated in FIG. 3;

FIG. 5A illustrates a front view of an exemplary embodiment of a retention element in accordance with aspects of the present inventions;

FIG. 5B illustrates a side view of the embodiment of a retention element similar to the embodiment of FIG. 5A;

FIG. 6 illustrates a side view of aspects of an exemplary embodiment of a retention element in accordance with aspects of the present inventions;

FIG. 7 illustrates a frontal view of an exemplary embodiment of a retention element in accordance with aspects of the present inventions;

FIG. 8A illustrates a frontal view an exemplary embodiment of a spiral of an elongated arm in accordance with aspects of the present inventions;

FIG. 8B illustrates a frontal view of an exemplary embodiment of another spiral of an elongated arm in accordance with aspects of the present inventions;

FIG. 9 illustrates a frontal view of another exemplary embodiment of a retention element in accordance with aspects of the present inventions;

FIG. 10 illustrates a perspective view of another exemplary embodiment of a retention element in accordance with aspects of the present inventions; and FIG. 11 illustrates a perspective view of another exemplary embodiment of a retention element in accordance with aspects of the present inventions.

Figure 4C:
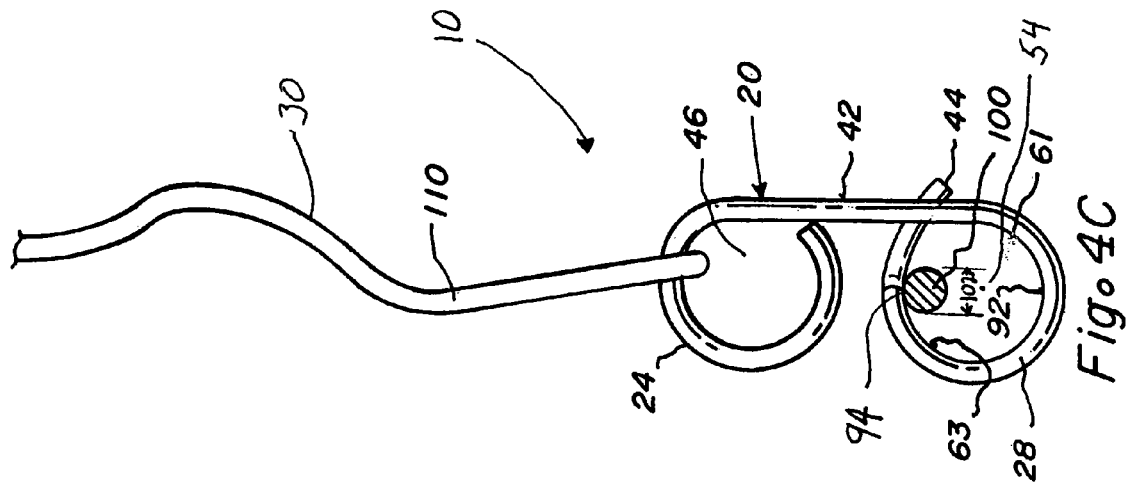
FIG. 4C illustrates a frontal view of exemplary embodiments of a retention element and a tether in accordance with aspects of the present inventions secured over a fitting with a slack tether.

All Figures are illustrated for ease of explanation of the basic teachings of the present invention only; the extensions of the Figures with respect to number, position, relationship and sequence of the parts to form the system will be explained or will be within the skill of the art after the following description has been read and understood. Where used in various Figures of the drawings, the same numerals designate the same or similar parts.

DETAILED DESCRIPTION OF THE INVENTION

The Figures generally illustrate exemplary embodiments of restraint apparatus 10 including retention elements 20 and, in some embodiments, tethers 30 in accordance with aspects of the present inventions. The particularly illustrated embodiments of the retention elements 20 and tethers 30 have been chosen for ease of explanation and understanding of various aspects of the present inventions. These illustrated embodiments are not meant to limit the scope of coverage but, instead, to assist in understanding the context of the language used in this specification and in the appended claims. Accordingly, the appended claims may encompass variations of the present inventions that differ from the illustrated embodiments.

Restraint apparatus 10 and methods in accordance with the present inventions are typically configured to secure items to vehicles and trailers for transport. The restraint apparatus 10 and methods in accordance with the present inventions may be particularly adapted to secure items to the beds of trucks or trailers or may be adapted to secure items on cargo racks or roof racks of a motor vehicle, or may be otherwise configured for securing items in other situations as will be recognized by those skilled in the art upon review of the present disclosure. In certain aspects, restraint apparatus 10 may be configured as tie-downs to retain recreational vehicles such as motorcycles, all-terrain-vehicles, snowmobiles, personal watercraft, boats and the like on trailers. The restraint apparatus 10 may be secured to a fitting 100. Fittings 100 typically have an elongated portion to which the restraint apparatus 10 is secured. The fittings 100 may be of the type used for securing the traditional hooks found on prior tie-down systems. These fittings 100 may be an eyelet, an eye, a shackle, a loop, a ring, a cleat, a hole in a structural member, a rod, or a bar such as those typically provided on trailers, in the beds of pick-up trucks, on luggage racks, on roof racks and the like for securing items 200. The fittings 100 may alternatively be similar to those used in the commercial transport industry that are typically secured to the beds, floors, decks, or walls of vehicles, rail cars, ships, and aircraft. The fittings 100 may be fixed or movable relative to vehicle or trailer. Alternatively, the fitting 100 may be otherwise configured as will be recognized by those skilled in the art upon review of the present disclosure adapted to secure a restraint apparatus 10 in accordance with the present inventions.

Restraint apparatus 10 in accordance with aspects of the present inventions may include one or more retention elements 20. A retention element 20 in accordance with the present inventions is generally configured to engage a fitting 100. In other aspects, one or more retention elements 20 may be secured to a tether 30 to form a restraint apparatus 10 in accordance with the present inventions. The retention element 20 typically includes a body 24 and an elongated arm 28. The body 24 is adapted to support a tensile force and may be particularly configured to be secured to a tether 30 or other additional components of a restraint apparatus 10. The elongated arm 28 is secured to or integral with the body 24. The elongated arm 28 extends from the body 24 and at least a portion of the elongated arm 28 is configured as a spiral 60. At least a portion of the spiral 60 extends from a plane 50 about an axis 54. The spiral 60 is generally configured to receive and engage a fitting 100 such that a tensile force may be applied between the retention element 20 and the fitting 100.

The retention element 20 may be formed from various materials which are typically selected and configured to satisfy the strength and durability requirements for the particular application for a retention element 20. In certain aspects, the retention element 20 may be composed of various metals and metal alloys and of various plastics and such other materials and combinations of materials as would be readily recognized by those skilled in the art upon review of the present disclosure.

The retention element 20 may be constructed as from a single component or assembled from a set of components. Further, the body 24 and the elongated arm 28 may be constructed as from a single component or assembled from a set of components. When the retention element 20 is formed from a single component, the body 24 and elongated arm 38 may machined from a billet material, formed by bending a rod or bar, or otherwise manufactured as will be recognized by those skilled in the art upon review of the present disclosure. In one exemplary method for manufacturing a restraint apparatus 10, a unitary elongated rod can be bent so that a portion of the rod forms the body 24 and a portion of the rod forms the elongated arm 28. When the body 24 and elongated arm 28 are formed as separate components, the components may be secured to one another by welding, riveting, mechanical interlocking, or using various other fasteners or methods that will be recognized by those skilled in the art upon review of the present disclosure.

The body 24 is generally configured to support a tensile load applied to a restraint apparatus 10. The body 24 is particularly configured to be secured to a tether 30 or other component(s) of a restraint apparatus 10. In certain aspects, the body 24 may define an aperture 46 configured to receive and retain a tether 30. The body 24 is secured or integral to the elongated arm 28 and is typically configured such that a tether 30 or other component(s) of a restraint apparatus 10 will be connected to a first side of the body and the elongated arm 28 and associated spiral 60 will extend from a second side of the body 24. The first side and the second side are typically opposing sides of the body 24. The body 24 may further generally define a body plane. The body plane may correspond to the plane 50 or may be otherwise oriented relative to the plane 50 as will be recognized by those skilled in the art upon review of the present disclosure.

The body 24 of the retention element 20 may have various orientations with respect to the plane 50 and the axis 54. The orientation of the body 24 with respect to the axis 54 in a particular embodiment may depend upon the nature of the tether 30 to be used with that particular embodiment as well as the way in which that tether 30 is received and secured to the body 24. In some embodiments, it may be advantageous to orient the body plane perpendicular to the plane 50 in order to facilitate retention of the fitting 100 on the elongated arm 28.

The elongated arm 28 is generally configured to receive and retain a fitting 100 about a spiral 60 of the elongated arm 28. The elongated arm 28 has a first end 42 and a second end 44. The body 24 is typically secured toward to the first end 42 of the elongated arm 28. The spiral 60 is typically formed toward the second end 44 of the elongated arm 28 and may extend to the second end 44 or to a location before the second end 44 of the elongated arm 28. The spiral 60 of the elongated arm 28 may be generally configured to increase the probability relative to traditional hooks that the retention element 20 will be retained on a fitting 100 prior to a tensile force being applied between the retention element 20 and the fitting 100 or during transient periods, such as during loading or transport for example, when the tensile force between the retention element 20 and the fitting 100 may be temporarily absent. At least a portion of the spiral 60 extends from a plane 50 such that a plurality of points along the spiral 60 lie outside the plane 50. The spiral rotates outward from the plane 50 substantially about an axis 54. In one aspect, the axis 54 may be normal to the plane 50.

The axis 54 passes through the interior 61 of the spiral 60. The spiral 60 has an inner surface 63 that is oriented toward the axis 54, and the spiral 60 is configured such that the inner surface 63 of the spiral 60 of elongated arm 28 surrounds the axis 54. The inner surface 63 of the spiral 60 defines an interior 61 of the spiral 60. Interior 61 is generally configured to receive a portion of the fixation element 100. A portion of a fitting 100 passing through the interior 61 of the spiral 60 and generally aligned with the axis 54 may then be surrounded by the inner surface 63 of the spiral 60 of elongated arm 28.

The elongated arm 28 defines a gap 90 between successive turns of the spiral 60 or between the spiral 60 and an adjacent portion of the elongated arm 28 or body 24. The gap 90 typically allows the retention element 20 to be attached to and detached from the fitting 100. Accordingly, the gap 90 may configured to receive a width 102 of a retention element 100 to position the retention element 100 within the interior 61 of spiral 60. Once positioned within the interior 61 of spiral 60, the fitting 100 may be rotated relative to the retention element 20 to substantially align the length 104 of the fitting 100 with the axis 54. Depending on the particular configuration, the fitting 100 may be enclosed by the inner surface 63 of the spiral 60 by rotating the retention element 20 toward parallel with the axis 54. A lower aspect 92 of the inner surface 63 may be configured to bias against the fitting 100 when tension is applied to a tether 30 secured to the retention element 20 or otherwise as will be recognized by those skilled in the art upon review of the present disclosure. When curved, the lower aspect 92 of the inner surface 63 of the spiral 60 may tend to cause the retention element 20 to rotate so that the fitting 100 passes through the interior 61 of the spiral 60 is more-or-less aligned with the axis 54. An upper aspect 94 of the inner surface 63 may partially or fully enclose the interior 61 when viewed along the axis 54 to, at least in part, retain a fitting 100 positioned within the interior 61. When positioned within the interior 61, the fitting 100 is substantially surrounded or surrounded, depending on configuration, by the lower aspect 92 and the upper aspect 94 of the inner surface 63.

In certain aspects, the fitting 100 may be released from the interior 61 of the retention element 20 by turning the retention element 20 so that the length 104 of fitting 100 is more closely aligned with the plane 50 than axis 54 so that the width 102 of fitting 100 may be passed through gap 90 of the retention element 20. The spiral 60 of elongated arm 28 may have various configurations with respect to the axis 54. In certain aspects, the axis 54 may be perpendicular to a plain 50. The plane 50 extends through at least a portion of the elongated arm 28 and may, in certain embodiments, be defined by a substantially planar region of elongated arm 28. The portion of the first arm 28 through which the plane 50 extends is typically toward the first end 42 of the elongated arm 28. In certain aspects, portions of the elongated arm 28 generally proximate the spiral 60 may lie in the plane 50. Similarly, the first end 42 of the elongated arm 28 may lie within plane 50.

The elongated arm 28 may be formed in a spiral 60 about the axis 54 such that the second end 44 of the elongated arm 28 lies outside the plane 50. The axis 54 serves as the axis of the spiral 60. Successive portions of the spiral 60 proceeding from the first end 42 to the second end 44 may lie at a constant radius 62 with respect to the axis 54, thereby forming the spiral 60 having a constant radius 62. In other embodiments, successive portions of the spiral 60 proceeding from the first end 42 to the second end 44 may lie at successively decreasing radii with respect to the axis 54 thereby forming a spiral 60 having a generally conical shape or frusto-conical shape. In still other embodiments, successive portions of the spiral 60 proceeding from the first end 42 to the second end 44 may lie at successively increasing radii with respect to the axis 54 thereby forming a spiral 60 having a generally inverted frusto-conical shape.

In forming the spiral 60, the elongated arm 28 may rotate through a rotation 64 of at least about 270 degrees so as to surround the axis 54 and thus provide an inner surface 63 that can bias against a portion of a fitting 100 passing through the interior 61. While some embodiments could be configured with additional rotation 64, the rotation 64 of the spiral 60 of elongated arm 28 about the axis 54 would not typically exceed about 540 degrees between the first end 42 and the second end 44.

The tether 30 is generally configured to exert tension on a retention element 20. The tether 30 may be generally configured to exert tension between a first retention element 120 and a fitting 100. In one aspect, the tether 30 may include a first retention element 120 secured to a first end of the tether 30 to form a restraint apparatus 10. In another aspect, the tether 30 may include a first retention element 120 secured to a first end of the tether 30 and a second retention element 220 secured to a second end of the tether 30 to form a restraint apparatus 10.

Typically, the tether 30 is configured to be received over or through an item being secured by a restraint apparatus 10. The tether 30 may include one or more straps, ropes, cables, chains, or any of various elastic bands such as a bungee cord, or similar elongated members used to secure cargo. The tether 30 may be made from plastics, natural materials, metals and metal alloys, and combinations thereof, as would be readily understood.

The tether 30 may include a first tether portion 110 and a second tether portion 210. The first tether portion and the second tether portion may be secured to one another by a fastener 130. The fastener 130 may be a clamp, a buckle, various ratchet and cam type mechanisms, or any of a wide variety of similar devices for securing the relative positions of the first tether portion 110 and the second tether portion 210. In certain aspects, the fastener may include a mechanism to draw opposing ends of the first tether portion 110 and the second tether portion 210 together. In some aspects, a fastener 130 may be integral with or secured to a retention element 20. In certain aspects, the tether may be self-tensioning, for example, the tether or a portion thereof may be configured from an elastic material.

For exemplary purposes, FIG. 1 illustrates a perspective view of a restraint apparatus 10 configured as a retention element 20 in accordance with aspects of the present inventions. As illustrated, the retention element 20 is formed from a single rod shaped to form the body 24 and the elongated arm 28. A portion of the rod is bent in an elongated loop to form the body 24. The loop of the body 24 forms an aperture 46 configured to be secured to a tether 30. The aperture 46, in this embodiment, is substantially rectangular and is substantially enclosed by the portion of the rod that forms the body 24. In the illustrated embodiment, the elongated arm 28 extends from about a first end 42 to a second end 44. Being of unitary construction, the first end 42 as illustrated is an approximation of the junction between the body 24 and the elongated arm 28 for purposes of this description. The elongated arm 28 forms a spiral 60 between the first end 42 and the second end 44. The spiral 60 rotates about an axis 54 and includes a substantially linear portion between the second end 44 and the spiral 60. As illustrated, the upper aspect 94 of the elongated arm 28 substantially encloses the interior 61 when viewed along axis 54.

FIG. 2 illustrates an exemplary embodiment of a restraint apparatus 10 including a tether 30 having a first retention element 120 secured at a first end and a second retention element 220 secured at a second end. The tether 30 includes a first tether portion 110 secured to a second tether portion 210 by a fastener 130. The first tether portion 120 and the second tether portion 220 of the tether 20 are each configured as a strap. The fastener 130 secures the first tether portion 110 to the second tether portion 210 such that the length of the tether 30 may be reduced by a user. The ability to reduce the length permits the tensioning of the restraint apparatus 10 to permit items 300, shown in FIG. 3, to be secured by restraint apparatus 10 relative to the fittings 100, also shown in FIG. 3.

FIGS. 3 and 3A illustrate an exemplary embodiment of restraint apparatus 10 securing an item 200, in the form of a snowmobile, to between fittings 100 of a trailer 300. The rearward positioned restraint apparatus 10 is illustrated as taught. The forward positioned restraint apparatus 10 is illustrated as slack. The illustrated restraint apparatus 10 includes a tethers 30 having first retention elements 120 secured at first ends and second retention elements 220 secured at second ends. The tethers 30 include first tether portions 110 secured to second tether portions 210 by fasteners 130. The retention elements 20 are secured to fittings 100. The fittings 100 in are shown as integrated with side rails on the trailer. The first tether portion 110 and the second tether portion 210 are configured as straps that are passed between the two retention elements 20 and over item 200. The fastener 130 is used to secure the relative positions of the first tether portion 110 and the second tether portion 210. As illustrated, the fastener 130 may further include a ratcheting type mechanism to draw the opposing ends of tether 30 toward one another until the tether 30 is sufficiently taut about item 200 to secure the item 200 to trailer 300.

In the illustrated taut restraint apparatus 10, the tether 30 has been drawn taught by the relative positioning of the first tether portion 110 and the second tether portion 210 to shorten the length of the tether 30. The fastener 130 secures the relative position of the first tether portion 110 and the second tether portion 210. The fittings 100 are securably engaged through the interior 61 of spirals 60 of the retention elements 20.

In the illustrated slack restraint apparatus 10, the tether 30 is shown slack with substantial play which could permit the movement of the restraint elements 20 relative to the fittings 100. The interior 61 of spiral 60 tends to confine the fitting 100 to hold the retention elements 28 on fitting 100 before tension is applied to the tether 30. This may allow the slack tether 30 to be drawn taut without the retention element 20 releasing the fitting 100 during the process of securing an item 200.

Figure 4A:
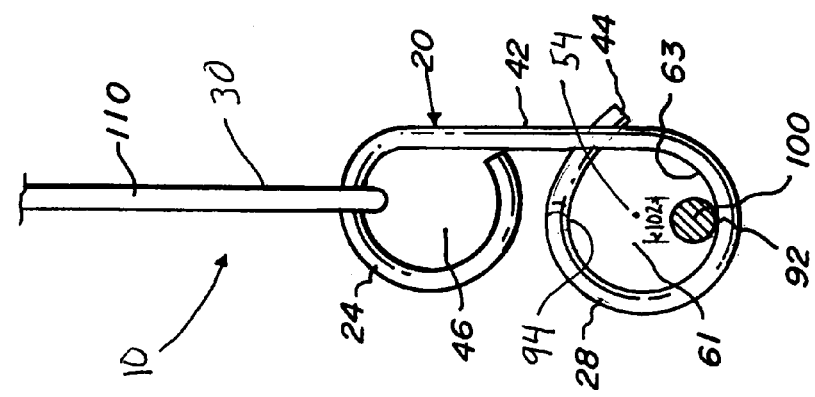
FIG. 4A illustrates a frontal view of exemplary embodiments of a retention element and a tether in accordance with aspects of the present inventions secured over a fitting with a taut tether.
Figure 4B:
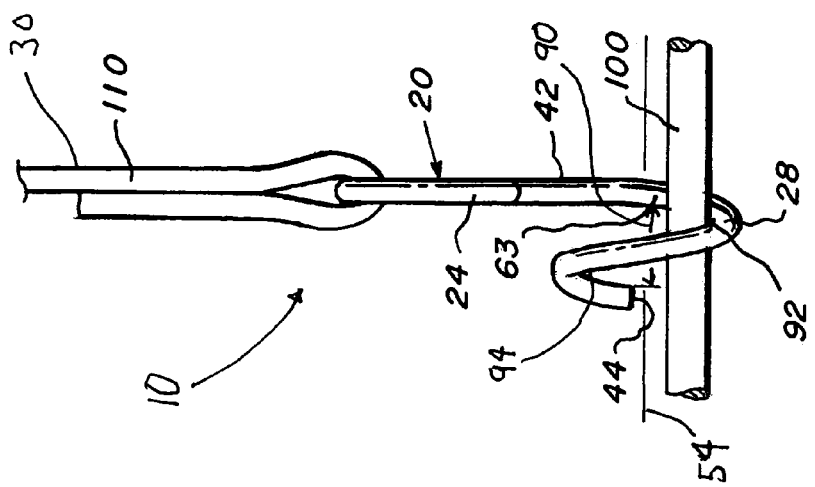
FIG. 4B illustrates a side view of exemplary embodiments of a retention element and a tether similar to the embodiments of FIG. 4A secured over a fitting with a taut tether.

FIGS. 4A and 4B illustrate a frontal view and a side view of another exemplary restraint apparatus 10 biased against a fitting 100 in accordance with aspects of the present inventions. The illustrated restraint apparatus 10 includes a tether 30 and a retention element 20. The retention element 20 includes an elongated arm 28 defining a spiral 60. The spiral 60 defines an interior 61 which receives a fitting 100. An upper aspect 94 of the spiral encloses the interior 61 when viewed along axis 54. The upper aspect 94 tends to retain a fitting 100 within the interior 61 when there is no force biasing the lower aspect 92 of the spiral 60 against the fitting 100. The tether 30 is configured as a rope for exemplary purposes. The tether 30 is secured to the body 24 of the retention element 20 through an aperture 46. The retention element 20 is shown being biased in tension against the fitting 100 by forces applied through tether 30. In tension, the fitting 100 is typically biased against a lower aspect 92 of the spiral 60. The gap 90 is defined between the end 44 and the elongated body 28 at the beginning of the spiral 60. The gap 90 is sized to receive the width 102 of an elongated portion of the fitting 100. FIG. 4B illustrates a side view of the embodiment of the retention element 20 illustrated in FIG. 4A. The fitting 100 is shown received on an inner surface 63 along the lower aspect 92 of the interior 61 when the restraint apparatus 10 is in tension. The interior is typically sized to at least receive the width 102 of a corresponding fitting 100. As illustrated, tension in the tether 30 pulls the inner surface 63 of the retention element 20 against the fitting 100 along a lower aspect 92 of the spiral 60.

FIG. 4C illustrates the restraint apparatus 10 of FIGS. 4A and 4B with a slack tether 30. The illustrated retention element 20 includes a fitting 100 received through the interior 61 of spiral 60. The tether 30 is secured to the body 24 of the retention element 20 through the aperture 46, but no tension is applied by the tether 30. As illustrated, the inner surface 63 may surround the fitting 100 so that an upper aspect 94 abuts the fitting 100 to retain the fitting 100 within the interior 61 when the tether 30 is slack. The fitting 100 may need to be oriented to some degree along the axis 54 depending upon the configuration of the spiral and to varying degrees the width of the gap 90 as will be recognized by those skilled in the art upon review of the present disclosure. Thus, as FIG. 4C illustrates, the spiral 60 configuration of the attachment feature may facilitate retention of the fitting 100 within the interior 61 of the spiral 60 prior to the application of tension to the tether portion 110.

FIG. 5A illustrates a front view of another exemplary embodiment of an apparatus 10 in accordance with aspects of the present inventions. As illustrated, the restraint apparatus includes a retention element 20 formed from a rod. The body 24 is formed from a portion of the bar with the remainder of the bar formed into the elongated arm 28. In this embodiment, the rotation 64 of the spiral 60 is about 450 degrees, and the radius 62 of the spiral 60 is constant about the axis 54. As illustrated, the upper aspect 94 of the elongated arm 28 totally encloses the interior 61 when viewed along axis 54.

FIG. 5B illustrates a side view of the embodiment illustrated in FIG. 5A. The spiral 60 extends along the axis 54 such that the second end 44 of the elongated arm 28 lies outside the plane 50. This Figure also illustrates the gap 90 and the lower aspect 92 encompassed by the gap 90. The gap 90 may be sized to pass the width 102 of a fitting 100, not shown, into the interior 61 of the spiral 60. The spiral 60 in this embodiment is a helical spiral 60 having a constant radius 62. The second end 44, in this embodiment, has a flat squared off configuration. However, it may be advantageous, in some embodiment, to configure the second end 44 of the elongated arm 28 with a point, beveled, rounded or in another configuration. Also, in this embodiment, the aperture 46 lies more or less in the plane 50. However, other embodiments may have the body 24 including the aperture 46 with a variety of orientations with respect to the axis 54 and to the plane 50.

A side view of an embodiment of the retention element 20 aspect of the present inventions is illustrated in FIG. 6. In this embodiment, the elongated arm 28 includes a second region 84 proximate to the second end 44 in which the configuration of the spiral 60 is altered so that the second end 44 points back toward the plane 50. This second region 84 may facilitate attachment of the elongated arm 28 to the fitting 100 or enhance the retention of the fitting 100 on the elongated arm 28.

In the embodiment illustrated in FIG. 6, the spiral 60 has a generally helical arrangement except in a retention portion 84 located on the elongated arm 28 adjacent to second end 44. The orientation of the retention portion 84 with respect to the plane 50 and/or the axis 54 may differ from the orientation of the elongated arm 28 elsewhere within the spiral and/or elsewhere along the elongated arm 28 with respect to the plane 50 and/or the axis 54. The retention portion 84 of the elongated arm 28 may be configured so that the retention portion 84 of the elongated arm 28 defines a spiral 60 that descends toward the plane 50 such that the second end 44 of the elongated arm 28 is oriented toward the plane 50, as illustrated. In various embodiments, the retention portion 84 may be linear or a series of linear elements and oriented to form a hook or otherwise configured to facilitate attachment of the elongated arm 28 to the fitting 100 or retain the fitting 100 within the interior 61 of spiral 60. Other embodiments may include a retention portion 84 having a configuration that may be curved, straight, or combinations thereof, and have any of a number of orientations with respect to the axis 54 and to the plane 50.

An embodiment of the retention element 20 aspect of the present invention is illustrated in FIG. 7. In this embodiment, the elongated arm 28 is configured as a spiral 60 having a decreasing radius 62 from the first end 42 to the second end 44. This spiral 60 may have a frusto-conical shape. As illustrated, the upper aspect 94 of the elongated arm substantially encloses the interior 61 when viewed along axis 54.

FIGS. 8A and 8B illustrate the rotation 64 of the elongated arm 28 having a spiral 60 shape between the first end 42 and the second end 44. In FIG. 8A, the rotation 64 of the spiral 60 is about 360 degrees. As such, the upper aspect 94 of the elongated arm 28 partially encloses the interior 61 when viewed along axis 54. In FIG. 8B, the rotation 64 of the spiral 60 is about 450 degrees. As such, the upper aspect 94 of the elongated arm 28 fully encloses the interior 61 when viewed along axis 54.

FIG. 9 illustrates an embodiment of a retention element 20 in accordance with aspects of the present inventions in which the body 24 is configured from a flat plate and the elongated arm 28 is secured at the first end 42 to the body 24. The body 24 is configured to receive and retain a tether portion 110 configured as a strap. The aperture 46 is open at one side so that the strap may be slipped into the aperture 46 through the open side. As illustrated, the upper aspect 94 of the elongated arm 28 substantially encloses the interior 61 when viewed along axis 54.

In the embodiment of FIG. 10, the body 24 is oriented so that the plane defined by the body is oriented at an approximately 90 degree angle relative to the plane 50. As noted above, a variety of possible orientations of the body 24 and the aperture 46 with respect to the plane 50 and axis 54, and, hence, with respect to the spiral 60 of the elongated arm 28 are included. As illustrated, the upper aspect 94 of the elongated arm 28 substantially encloses the interior 61 when viewed along axis 54.

In some embodiments, such as that illustrated in FIG. 11, the spiral 60 may be configured as a polygon. The second end 44 of the elongated arm 28 is positioned to form a closed interior 61, as illustrated. Although the spiral 60 is configured as a four sided [rectangle] polygon in this illustrated embodiment, the spiral 60 could be configured in a hexagonal, octagonal, or other polygonal configuration. As illustrated, the upper aspect 94 of the elongated arm 28 encloses the interior 61 when viewed along axis 54.

A restraint apparatus 10 including a one or more retention elements 20 secured to a tether 30 may be utilized in a variety of applications. In one exemplary use, a first retention element 120 is secured to the fitting 100. The first retention element 120 may be secured to the fitting 100 by orienting the spiral 60 of the elongated arm 28 so that the width 102 of the fitting 100 may pass through the gap 90. The fitting 100 may be positioned within the interior 61 of the spiral 60 such that the fitting is no longer oriented such that the width of the fitting may be passed through the gap 90. Typically, the length of fitting 100 must be oriented at an angle of at least 15 degrees from parallel with the plane 50 to prevent the passage of the fitting 100 through the gap 90 although depending on the configuration the angle may be less. In certain configurations, the length of fitting 100 may be oriented more toward parallel with the axis 54 than parallel with the plane 50 to prevent the passage through the gap 90. Then, rotating the retention element 20 so that portions of the fitting 100 are more-or-less aligned with the axis 50 and surrounded by the inner surface 63 of the spiral 60 secures the retention element 20 to the fitting 100.

The tether 30 is passed over or through an item 200. A second retention element 220 is secured to a second fitting 100. A first tether portion 110 of the tether may an end secured to a fastener 130. A second portion of the tether may be slidable engage through the fastener 130 and securable at a plurality of positions within the fastener 130 such that the length of the tether 30 can be adjusted by a user. The tether 30 is then drawn taut over the item 200 by reducing the length of the tether 30. The length of the tether 30 is maintained by the fastener 130 securing the relative positions of the first tether portion 110 and the second tether portion 210.

In other embodiments, the tether 30 is configured as an elastic band, bungee, or similar elastic member. In these embodiments, a restraint apparatus 10 may similarly include a one or more retention elements 20 secured to a tether 30. A first retention element 120 is typically secured to a fitting 100 by passing the width 102 of the fitting 100 through a gap 90 to position the fitting 100 within the interior 61 of the spiral 60. The tether 30 may be stretched over a portion of an item 200. The second retention element 220 that is typically secured to a fitting 100 located on the opposing side of the item 200 by passing the width 102 of the fitting 100 through a gap 90 to position the fitting 100 within the interior 61 of the spiral 60. The elasticity of the tether 30 in this embodiment may provide sufficient tension to secure the item 200.

In various embodiments, the tether portion 110 or tether portions 110 may be placed in tension by the user pulling on the tether portion 110 or tether portions 110. In other embodiments, various mechanical apparatus such as winches, pulleys, capstans, reels, rotating drums, and similar may be used to tension the tether portion 110 or tether portions 110 and may be used to hold the tether portion 110 or tether portions 110 in tension.

The application of tension to a tether 30 attached to the retention element may tend to rotate the retention element 20 about the fitting 100. This rotation may cause the fitting 100 to orient itself through the interior 61 of the spiral 60 in a direction substantially parallel to the axis 54 such that the fitting 100 may be surrounded by an upper aspect 94 and a lower aspect 92 of the inner surface 63. In this orientation, for example, the portion of the fitting 100 passing through the interior 61 of the spiral 60 may contact the upper aspect 94 if the tether portion 10 is allowed to go slack due to the pull of gravity or otherwise. However, contact with the upper aspect 94 may retain the fitting 100 within the interior 61 of the spiral 60. When a force is applied to the retention element 20 such as by applying a tension to a tether 30 attached to the retention element 20, a lower aspect 92 of the inner surface 63 of the spiral 60 is biased against the fitting 100 so that the fitting 100 secured within the interior 61.

The foregoing discussion discloses and describes merely exemplary embodiments of the present inventions. Upon review of the specification, one skilled in the art will readily recognize from such discussion, and from the accompanying figures and claims, that various changes, modifications and variations can be made therein without departing from the spirit and scope of the invention as defined in the following claims.

What is claimed is:

1. An attachment apparatus, comprising:
   a body, the body further comprising a retention portion configured to secure a tether; and
   an elongated arm attached to the body, the elongated arm further comprising:
     a substantially straight portion attached to the body, the elongated arm forming an angle with respect to the body; and
     a spiral portion, the spiral portion defining an interior configured to retain a fitting, the spiral portion having a gap therein, the gap dimensioned to receive a portion of the fitting and to allow the portion of the fitting to pass through the gap and to be positioned within the interior of the spiral.

2. The attachment apparatus of claim 1, further comprising the spiral extending about 360 degrees to about 540 degrees around an axis.

3. The attachment apparatus of claim 1, wherein the spiral has an axis, and wherein at least a portion of the spiral has a constant radius with respect to the axis.

4. The attachment apparatus of claim 1, wherein the spiral has an axis, and wherein at least a portion of the spiral has a decreasing radius with respect to the axis.

5. The attachment apparatus of claim 1, wherein the spiral has an axis, and wherein at least a portion of the spiral has an increasing radius with respect to the axis.

6. The attachment apparatus of claim 1, wherein the spiral portion includes an axis about which the spiral is wound, the body having a plane which is substantially perpendicular to the axis of the spiral, the retention element including a flat plate attached to the body, the flat plate having an aperture therein, the flat plate being in a plane substantially perpendicular to a plane of the body.

7. The attachment apparatus of claim 1, wherein the spiral portion includes an axis about which the spiral is wound, the body having a plane which is substantially perpendicular to the axis of the spiral, the retention element made from the same material as the spiral portion formed to have an aperture therein, the slot being in a plane substantially perpendicular to a plane of the body.

8. The attachment apparatus of claim 1, wherein the spiral portion includes an axis about which the spiral is wound, the body having a plane which is substantially perpendicular to the axis of the spiral, the retention element made from the same material as the spiral portion formed to have an aperture therein, the slot being in a plane substantially parallel to a plane of the body.

9. The attachment apparatus of claim 1, wherein the spiral portion includes an axis about which the spiral is wound, the body having a plane which is substantially perpendicular to the axis of the spiral, the retention element including a flat plate attached to the body, the flat plate having a slot therein, the flat plate being in a plane substantially parallel to a plane of the body.

10. The attachment apparatus of claim 1, wherein the spiral portion includes an axis about which the spiral is wound, the body having a plane which is substantially perpendicular to the axis of the spiral, the retention element made from the same material as the spiral portion formed to have a slot therein, the slot being in a plane substantially parallel to a plane of the body.

11. The attachment apparatus of claim 10, wherein the material of the spiral portion and the retention element includes a metal rod.

12. The attachment apparatus of claim 1, wherein the spiral portion includes an axis about which the spiral is wound, the body having a plane which is substantially perpendicular to the axis of the spiral, the retention element made from the same material as the spiral portion formed to have a slot therein, the slot being in a plane substantially perpendicular to a plane of the body.

13. The attachment apparatus of claim 12, wherein the material of the spiral portion and the retention element includes a metal rod.

14. A restraint apparatus further comprising:
   a tether further comprising:
     a first tether portion having:

a first end; and
a first intermediate portion;
a second tether portion having:
a second end; and
a second intermediate portion;
a fastener attached to the first intermediate portion of the first tether portion, and the second intermediate portion of the second tether portion, the fastener for securing the relative positions of the first tether portion and the second tether portion;
a first retention element attached to the first end of the first tether portion; and
a second retention element attached to the second end of the second tether portion, both the first retention element and the second retention element further comprising:
a body, the body further comprising a tether retention portion configured to secure one of the first end or the second end of the tether; and
an elongated arm attached to the body, the elongated arm further comprising:
a substantially straight portion attached to the body; and
a spiral portion, the spiral portion defining an interior configured to removably attach to a fitting, the spiral portion having a gap therein, the gap dimensioned to receive a portion of the fitting and to allow the portion of the fitting to pass through the gap and to be positioned within the interior of the spiral, the fastener holding the first intermediate end and the second intermediate end relative to one another after the tether is tightened.

15. The restraint apparatus of claim 14, wherein the spiral portion of the first and second restraint elements includes an axis about which the spiral is wound, the body having a plane which is substantially perpendicular to the axis of the spiral, the retention element including a flat plate attached to the body, the flat plate having a slot therein, the flat plate being in a plane substantially parallel to a plane of the body.

16. The restraint apparatus of claim 14, wherein the spiral portion includes an axis about which the spiral is wound, the body having a plane which is substantially perpendicular to the axis of the spiral, the retention element made from the same material as the spiral portion formed to have a slot therein, the slot being in a plane substantially parallel to a plane of the body.

17. The restraint apparatus of claim 16, wherein the material of the spiral portion and the retention element includes a metal rod.

18. The restraint apparatus of claim 16 wherein the tether is formed of a flat nylon webbing material, the slot dimensioned to receive the flat nylon webbing material.

19. The restraint apparatus of claim 14, wherein the spiral portion includes an axis about which the spiral is wound, the body having a plane which is substantially perpendicular to the axis of the spiral, the retention element made from the same material as the spiral portion formed to have a slot therein, the slot being in a plane substantially perpendicular to a plane of the body.

20. A kit for retraining an item, the kit including a plurality of the restraint apparatus of claim 14 and an instruction set including directions for use.

* * * * *